US011757701B2

(12) United States Patent
Xie et al.

(10) Patent No.: US 11,757,701 B2
(45) Date of Patent: Sep. 12, 2023

(54) METHOD FOR RECOMMENDING SIMILAR INCIDENT, AND RELATED DEVICE

(71) Applicant: HUAWEI TECHNOLOGIES CO., LTD., Shenzhen (CN)

(72) Inventors: Qing Xie, Dongguan (CN); Likun Li, Shenzhen (CN); Zhiyong Tian, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/946,788

(22) Filed: Sep. 16, 2022

(65) Prior Publication Data

US 2023/0017653 A1 Jan. 19, 2023

Related U.S. Application Data

(63) Continuation of application No. PCT/CN2021/078895, filed on Mar. 3, 2021.

(30) Foreign Application Priority Data

Mar. 18, 2020 (CN) .......................... 202010192545.2

(51) Int. Cl.
*H04L 41/0631* (2022.01)
*H04L 41/0604* (2022.01)
*H04L 41/069* (2022.01)

(52) U.S. Cl.
CPC ...... *H04L 41/0631* (2013.01); *H04L 41/0604* (2013.01); *H04L 41/069* (2013.01)

(58) Field of Classification Search
CPC ............. H04L 41/0631; H04L 41/0604; H04L 41/069

(Continued)

(56) References Cited

U.S. PATENT DOCUMENTS 10,289,478 B2   5/2019  Cheng et al.
10,685,359 B2 * 6/2020  Walthers .......... G06F 16/24578
(Continued)

FOREIGN PATENT DOCUMENTS

CN    107248927 A    10/2017
CN    107770797 A     3/2018
(Continued)

OTHER PUBLICATIONS

Baowu et al., "Electronic Equipment Fault Diagnosis Technology Based on Case Reasoning and Event Sequence Diagram," Electronic Technology and Software Engineering, Baden-Baden, ISBN 978-3-8487-3794-9, ISBN 3-8487-3794-9, Total 9 pages (Feb. 15, 2020). With an English machine translation.

(Continued)

*Primary Examiner* — Melvin H Pollack
(74) *Attorney, Agent, or Firm* — Leydig, Voit & Mayer, Ltd.

(57) ABSTRACT

A system and method for recommending a similar incident in operations technologies and a related device are provided. The method includes: obtaining alarm information of a to-be-processed incident; obtaining incident diagnosis information of M dimensions based on the alarm information, wherein the M dimensions include M different perspectives of incident diagnosis, and M is an integer greater than 1; performing processing based on the incident diagnosis information of the M dimensions, to obtain a feature of the to-be-processed incident; obtaining a plurality of similarity degrees through calculation based on the feature of the to-be-processed incident and features of a plurality of historical incidents, wherein the plurality of similarity degrees represent respective similarity degrees between the to-be-processed incident and the plurality of historical incidents; and obtaining a similar incident from the plurality of his- (Continued)

torical incidents through filtering based on the plurality of similarity degrees, and recommending the similar incident.

20 Claims, 7 Drawing Sheets

(58) Field of Classification Search
USPC .......................................................... 709/224
See application file for complete search history.

(56) References Cited

U.S. PATENT DOCUMENTS

| | | | |
|---|---|---|---|
| 10,922,493 B1* | 2/2021 | Das | G06F 16/243 |
| 10,965,559 B1* | 3/2021 | Bettaiah | G06F 16/24578 |
| 11,044,179 B1* | 6/2021 | Bettaiah | H04L 41/5009 |
| 11,051,768 B1* | 7/2021 | McNair | A61M 16/0051 |
| 11,102,236 B2* | 8/2021 | Shurtleff | H04L 43/065 |
| 11,115,432 B2* | 9/2021 | Singh | H04L 63/1433 |
| 11,140,038 B2* | 10/2021 | Benjamin | H04L 41/0853 |
| 11,159,363 B2* | 10/2021 | Xiao | H04L 41/0677 |
| 11,159,545 B2* | 10/2021 | Higbee | H04L 63/1433 |
| 11,170,761 B2* | 11/2021 | Thomson | G10L 15/06 |
| 11,199,837 B2* | 12/2021 | Celia | G05B 19/4185 |
| 11,200,130 B2* | 12/2021 | Tankersley | G06Q 10/06393 |
| 11,204,824 B1* | 12/2021 | Tiwari | G06F 11/0793 |
| 11,275,357 B2* | 3/2022 | Liu | G01D 9/005 |
| 11,394,629 B1* | 7/2022 | Grilli | G06F 7/08 |
| 11,468,365 B2* | 10/2022 | Olgiati | G06T 1/20 |
| 11,513,935 B2* | 11/2022 | Przestrzelski | G06F 11/3086 |
| 11,528,231 B2* | 12/2022 | Vasseur | H04L 41/145 |
| 11,538,044 B2* | 12/2022 | Ben-Or | G06Q 30/0185 |
| 11,539,717 B2* | 12/2022 | Bratspiess | H04L 63/1416 |
| 11,562,170 B2* | 1/2023 | Edge | G06F 16/245 |
| 11,575,771 B2* | 2/2023 | Shribman | H04L 63/0407 |
| 11,586,166 B2* | 2/2023 | Joyal | H04Q 9/00 |
| 11,610,136 B2* | 3/2023 | Jasionowski | G06F 16/2465 |
| 2013/0311437 A1 | 11/2013 | Stluka et al. | |
| 2017/0308427 A1 | 10/2017 | Cheng et al. | |
| 2021/0224676 A1* | 7/2021 | Arzani | G06N 7/01 |
| 2021/0272684 A1* | 9/2021 | Atallah | G16H 40/60 |
| 2022/0292186 A1* | 9/2022 | Givental | G06F 21/554 |
| 2022/0334941 A1* | 10/2022 | Asai | G06F 11/0793 |

FOREIGN PATENT DOCUMENTS

| | | |
|---|---|---|
| CN | 108090567 A | 5/2018 |
| CN | 106404441 B | 11/2018 |
| CN | 108830745 A | 11/2018 |
| CN | 109902153 A | 6/2019 |
| CN | 109995561 A | 7/2019 |
| CN | 110309009 A | 10/2019 |
| CN | 110598645 A | 12/2019 |
| CN | 110609759 A | 12/2019 |
| CN | 110704231 A | 1/2020 |
| CN | 110752942 A | 2/2020 |
| CN | 111756560 A | 10/2020 |

OTHER PUBLICATIONS

Zheng et al., "An Event Correlation Approach Based on the Combination of IHU and Codebook," Computational Intelligence and Security, Part of the Lecture Notes in Computer Science book series (LNAI, vol. 3802), pp. 757-763, XP019031196, Springer-Verlag Berlin Heidelberg 2005 (Jan. 1, 2006).

Zhang et al., "Network Alarm Flood Pattern Mining Algorithm Based on Multi-dimensional Association," MSWIM'18: Proceedings of the 21st ACM International Conference on Modeling, Analysis and Simulation of Wireless and Mobile Systems, pp. 71-78, XP058417892, Montreal, Quebec, Canada (Oct. 28-Nov. 2, 2018).

S. Kliger et al., "A Coding Approach to Event Correlation," in "Integrated Network Management IV", Part of the IFIP—The International Federation for Information Processing book series (IFIPAICT), pp. 266-277, XP055419077, Springer Science+ Business Media Dordrecht (Jan. 1, 1995).

\* cited by examiner

| Similarity degree | Incident level | Incident number | Incident type | Maintenance suggestion | Incident status | Creation time |
|---|---|---|---|---|---|---|
| ↗ ■ 95% <br> 402 | Critical | 984 | [Environment] A temperature of a board is extremely high | 401 — View <br> Recommendation reason <br> ┌─────────────────────────┐ <br> │ Similarity-degree analysis │ <br> │ XXXXXXXXXXXXXXXXXXXX │ <br> │ XXXXXXXXXXXXXXXXXXXX │ <br> └─────────────────────────┘ ┌─────────────────────────┐ <br> │ Processing-experience similarity analysis │ <br> │ XXXXXXXXXXXXXXXXXXXXXXX │ <br> │ XXXXXXXXXXXXXXXXXXXXXXX │ <br> └─────────────────────────┘ | Resolved | 2019-06-09 10:13 |
| ↗ ■ 80% <br> 402 | Critical | 264 | [Hardware] A board incident | 401 — View | Resolved | 2019-06-09 10:13 |
| ↗ ■ 65% <br> 402 | Serious | 317 | [Hardware] A board incident | 401 — View | Resolved | 2019-06-09 10:13 |
| ↗ ■ 57% <br> 402 | General | 424 | [Environment] A temperature of a board is extremely high | 401 — View | Unresolved | 2019-06-09 10:13 |

FIG. 4

| Similarity degree | Incident level | Incident number | Incident type | Maintenance suggestion | Incident status | Creation time | Quantity of likes | Like |
|---|---|---|---|---|---|---|---|---|
| ∨ ▇ 95% | Critical | 984 | [Environment] A temperature of a board is extremely high | View | Resolved | 2019-06-09 10:13 | 16 | 👍 |
| Recommendation reason | | | | | | | | |
| Similarity-degree analysis XXXXXXXXXXXXXXXXXX XXXXXXXXXXXXXXXXXX | | | Processing-experience similarity analysis XXXXXXXXXXXXXXXXXXXX XXXXXXXXXXXXXXXXXXXX | | | | | |
| ∧ ▇ 80% | Critical | 264 | [Hardware] A board incident | View | Resolved | 2019-06-09 10:13 | 10 | 👍 |
| ∧ ▅ 65% | Serious | 317 | [Hardware] A board incident | View | Resolved | 2019-06-09 10:13 | 3 | 👍 |
| ∧ ▅ 57% | General | 424 | [Environment] A temperature of a board is extremely high | View | Unresolved | 2019-06-09 10:13 | 2 | 👍 |

501 — Creation time
502 — Quantity of likes

FIG. 5

Incident 150672

| Type | Quantity of alarms | Type of an affected service | Protection type | Quantity of affected services | Creation time |
|---|---|---|---|---|---|
| Network element out-of-service | 43 | Pseudo wire emulation edge to edge PWE3 | Tunnel group | 36 | 2020-03-05 14:34 |

Similar incident

| Incident number | Incident diagnosis dimension | Similarity comparison details | Level | Creation time |
|---|---|---|---|---|
| 984 | Network location, network ring/chain, and alarm type | Both the two incidents relate to the network side and the core ring, but the incident 150672 relates to a link alarm, and the incident 984 relates to a device out-of-service alarm | Critical | 2019-06-09 10:13 |

FIG. 6

METHOD FOR RECOMMENDING SIMILAR INCIDENT, AND RELATED DEVICE

CROSS-REFERENCE TO RELATED APPLICATIONS

This application is a continuation of International Application No. PCT/CN2021/078895, filed on Mar. 3, 2021, which claims priority to Chinese Patent Application No. 202010192545.2, filed on Mar. 18, 2020. The disclosures of the aforementioned applications are hereby incorporated by reference in their entireties

TECHNICAL FIELD

Embodiments of the present invention relate to the field of operations technologies, and in particular, to a method for recommending a similar incident, and a related device.

BACKGROUND

Currently, in a common manner of network operations, a network is monitored, an alarm reported by the network is collected, the alarm is displayed on an alarm list page, monitoring personnel or a semi-automatic tool identifies that the alarm may be an alarm that may be caused by an incident, and dispatches a case, and actual maintenance personnel checks a real incident on-site and rectify the incident. Generally, an incident that usually occurs in the network is a hardware-type incident, for example, device power-cut, an optical fiber disconnection, hardware damage (such as a board incident or an optical-module incident), or an incident that is usually alarmed and that is caused because some components are used for long duration or a device is aging due to a harsh environment. A few incidents are logical incidents or software incidents. For example, a quantity of services running on a ring exceeds a bandwidth upper limit, a service parameter is incorrectly configured, or congestion easily occurs locally due to inappropriate division of a network resource.

When the network is very large, similar incidents may occur repeatedly in different positions in the network. For example, incidents such as device power outage and out-of-service caused by line cut-off or poor power supply occur in different cell positions at different time points. During incident monitoring (or alarm monitoring), the monitoring personnel monitors and processes each actual incident independently. When similarity experience between incidents is not effectively accumulated and summarized by a network management system to form system knowledge, the monitoring personnel continuously performs repeated work.

In an existing technical solution, artificial intelligence for IT operations (AIOps) management software matches a similarity degree based on a proportion of a quantity of alarms, recommends a historical incident with a high matching degree based on the proportion, and then resolves an existing incident with reference to a solution to the historical incident. However, the similarity degree between the two incidents is determined only by comparing proportions of a quantity of same alarms of the two incidents. As a result, accuracy of the recommended historical incident is low, and consequently, a problem that the solution to the recommended historical incident has little reference significance is caused.

In conclusion, how to resolve the problem that the accuracy of the recommended historical incident is low and the solution to the incident has little reference significance is an urgent problem to be resolved by a person in the art.

SUMMARY

Embodiments of this application disclose a method for recommending a similar incident, and a related device. In this application, the similar incident is recommended through multi-dimension comparison, so that recommendation accuracy can be improved, and an effective reference is provided for resolving a to-be-processed incident. Therefore, network maintenance efficiency is improved.

According to a first aspect, this application discloses a method for recommending a similar incident. The method includes:

obtaining alarm information of a to-be-processed incident;

obtaining incident diagnosis information of M dimensions based on the alarm information, where the M dimensions include M different perspectives of incident diagnosis, and M is an integer greater than 1;

performing processing based on the incident diagnosis information of the M dimensions, to obtain a feature of the to-be-processed incident;

obtaining a plurality of similarity degrees through calculation based on the feature of the to-be-processed incident and features of a plurality of historical incidents, where the plurality of similarity degrees represent respective similarity degrees between the to-be-processed incident and the plurality of historical incidents; and obtaining a similar incident from the plurality of historical incidents through filtering based on the plurality of similarity degrees, and recommending the similar incident.

Compared with an existing technical solution in which a similar incident is recommended through single-dimension comparison, in this solution, the similar incident is recommended through multi-dimension similarity comparison, so that recommendation accuracy can be improved, and an effective reference is provided for resolving the to-be-processed incident. Therefore, network maintenance efficiency is improved.

In a possible implementation, after the obtaining alarm information of a to-be-processed incident and before the obtaining incident diagnosis information of M dimensions based on the alarm information, the method further includes:

obtaining, based on the alarm information, a network type of a network in which the to-be-processed incident is located; and determining the M dimensions based on the network type.

In this application, the plurality of dimensions used to perform similarity calculation are set based on the type of the network in which the incident is located. The dimensions are highly targeted and highly flexible, to further help improve the recommendation accuracy.

In a possible implementation, the performing processing based on the incident diagnosis information of the M dimensions, to obtain a feature of the to-be-processed incident includes:

performing feature extraction on each of the M dimensions based on the incident diagnosis information of the M dimensions, to obtain a feature value of each dimension; and combining the feature values of all the M dimensions, to obtain the feature of the to-be-processed incident, where the feature of the to-be-processed incident is a feature vector.

In this application, features of the plurality of dimensions are combined into the feature vector, to calculate the similarity degree. This facilitates calculation and improves calculation efficiency.

In a possible implementation, before the obtaining incident diagnosis information of M dimensions based on the alarm information, the method further includes: adjusting one or more dimensions in one or more preset dimensions, to obtain the M dimensions.

Similarity degrees obtained through calculation based on combinations of different dimensions are different. In this application, the plurality of dimensions used for similarity calculation may be flexibly adjusted, to help improve final recommendation accuracy.

In a possible implementation, the obtaining a similar incident from the plurality of historical incidents through filtering based on the plurality of similarity degrees, and recommending the similar incident includes:

obtaining N historical incidents from the plurality of historical incidents through filtering based on the plurality of similarity degrees, and recommending the N historical incidents, where the N historical incidents are historical incidents associated with top N similarity degrees in the plurality of similarity degrees, the plurality of similarity degrees are sorted in descending order, and N is a positive integer.

In this application, the historical incident with a high similarity degree is selected for recommendation, so that an effective reference can be provided for the to-be-processed incident.

In a possible implementation, after the obtaining a similar incident from the plurality of historical incidents through filtering based on the plurality of similarity degrees, the method further includes:

recommending comparison information between the similar incident and the to-be-processed incident, where the comparison information includes a condition of comparison between the similar incident and the to-be-processed incident in each of the M dimensions.

In this application, comparison details between the incidents are recommended, to help provide further reference information for operations personnel.

In a possible implementation, the plurality of historical incidents are incidents obtained from a database through filtering.

Because a large quantity of historical incidents are stored in the database, when similarity calculation is performed after filtering, a calculation resource can be saved, and calculation efficiency is improved, so that a requirement of a user can be responded more quickly, and a historical incident required by the user is recommended.

In a possible implementation, after the obtaining a similar incident from the plurality of historical incidents through filtering based on the plurality of similarity degrees, and recommending the similar incident, the method further includes:

receiving evaluation information for the recommended historical incident, where the evaluation information is used as reference information for subsequent historical-incident recommendation.

In this application, the evaluation information for the recommended historical incident may be used as a reference for the subsequent historical-incident recommendation, so that recommendation efficiency can be further improved, and the recommended historical incident can better satisfy a requirement of the user.

According to a second aspect, this application discloses a device. The device includes:

an obtaining unit, configured to obtain alarm information of a to-be-processed incident, where the obtaining unit is further configured to obtain incident diagnosis information of M dimensions based on the alarm information, where the M dimensions include M different perspectives of incident diagnosis, and M is an integer greater than 1;

a processing unit, configured to perform processing based on the incident diagnosis information of the M dimensions, to obtain a feature of the to-be-processed incident;

a calculation unit, configured to obtain a plurality of similarity degrees through calculation based on the feature of the to-be-processed incident and features of a plurality of historical incidents, where the plurality of similarity degrees represent respective similarity degrees between the to-be-processed incident and the plurality of historical incidents;

a filtering unit, configured to obtain a similar incident from the plurality of historical incidents through filtering based on the plurality of similarity degrees; and a recommendation unit, configured to recommend the similar incident.

In a possible implementation, the obtaining unit is further configured to: after obtaining the alarm information of the to-be-processed incident, and before obtaining the incident diagnosis information of the M dimensions based on the alarm information, obtain, based on the alarm information, a network type of a network in which the to-be-processed incident is located; and the device further includes a determining unit, configured to determine the M dimensions based on the network type.

In a possible implementation, the processing unit is specifically configured to:

perform feature extraction on each of the M dimensions based on the incident diagnosis information of the M dimensions, to obtain a feature value of each dimension; and combine the feature values of all the M dimensions, to obtain the feature of the to-be-processed incident, where the feature of the to-be-processed incident is a feature vector.

In a possible implementation, the device further includes an adjusting unit, configured to: before the obtaining unit obtains the incident diagnosis information of the M dimensions based on the alarm information, adjust one or more dimensions in one or more preset dimensions, to obtain the M dimensions.

In a possible implementation, the filtering unit is specifically configured to obtain N historical incidents from the plurality of historical incidents through filtering based on the plurality of similarity degrees; and the recommendation unit is specifically configured to recommend the N historical incidents, where the N historical incidents are historical incidents associated with top N similarity degrees in the plurality of similarity degrees, the plurality of similarity degrees are sorted in descending order, and N is a positive integer.

In a possible implementation, the recommendation unit is further configured to: after the filtering unit obtains the similar incident from the plurality of historical incidents through filtering based on the plurality of similarity degrees, recommend comparison information between the similar incident and the to-be-processed incident, where the comparison information includes a condition of comparison between the similar incident and the to-be-processed incident in each of the M dimensions.

In a possible implementation, the plurality of historical incidents are incidents obtained from a database through filtering.

In a possible implementation, the device further includes a receiving unit, configured to: after the recommendation unit recommends the similar incident, receive evaluation information for the recommended historical incident, where the evaluation information is used as reference information for subsequent historical-incident recommendation.

According to a third aspect, this application discloses a device. The device includes a processor, a communication interface, and a memory. The memory is configured to store a computer program and/or data, and the processor is configured to execute the computer program stored in the memory, to enable the device to perform the following operation:

obtaining alarm information of a to-be-processed incident;

obtaining incident diagnosis information of M dimensions based on the alarm information, where the M dimensions include M different perspectives of incident diagnosis, and M is an integer greater than 1;

performing processing based on the incident diagnosis information of the M dimensions, to obtain a feature of the to-be-processed incident;

obtaining a plurality of similarity degrees through calculation based on the feature of the to-be-processed incident and features of a plurality of historical incidents, where the plurality of similarity degrees represent respective similarity degrees between the to-be-processed incident and the plurality of historical incidents; and obtaining a similar incident from the plurality of historical incidents through filtering based on the plurality of similarity degrees, and recommending the similar incident.

In a possible implementation, after the obtaining alarm information of a to-be-processed incident and before the obtaining incident diagnosis information of M dimensions based on the alarm information, the device further performs the following operation:

obtaining, based on the alarm information, a network type of a network in which the to-be-processed incident is located; and determining the M dimensions based on the network type.

In a possible implementation, the performing processing based on the incident diagnosis information of the M dimensions, to obtain a feature of the to-be-processed incident includes:

performing feature extraction on each of the M dimensions based on the incident diagnosis information of the M dimensions, to obtain a feature value of each dimension; and combining the feature values of all the M dimensions, to obtain the feature of the to-be-processed incident, where the feature of the to-be-processed incident is a feature vector.

In a possible implementation, before the obtaining incident diagnosis information of M dimensions based on the alarm information, the device further performs the following operation: adjusting one or more dimensions in one or more preset dimensions, to obtain the M dimensions.

In a possible implementation, the obtaining a similar incident from the plurality of historical incidents through filtering based on the plurality of similarity degrees, and recommending the similar incident includes:

obtaining N historical incidents from the plurality of historical incidents through filtering based on the plurality of similarity degrees, and recommending the N historical incidents, where the N historical incidents are historical incidents associated with top N similarity degrees in the plurality of similarity degrees, the plurality of similarity degrees are sorted in descending order, and N is a positive integer.

In a possible implementation, after the obtaining a similar incident from the plurality of historical incidents through filtering based on the plurality of similarity degrees, the device further performs the following operation:

recommending comparison information between the similar incident and the to-be-processed incident, where the comparison information includes a condition of comparison between the similar incident and the to-be-processed incident in each of the M dimensions.

In a possible implementation, the plurality of historical incidents are incidents obtained from a database through filtering.

In a possible implementation, after the obtaining a similar incident from the plurality of historical incidents through filtering based on the plurality of similarity degrees, and recommending the similar incident, the device further performs the following operation:

receiving evaluation information for the recommended historical incident, where the evaluation information is used as reference information for subsequent historical-incident recommendation.

According to a fourth aspect, an embodiment of this application discloses a computer-readable storage medium. The computer-readable storage medium stores a computer program, and the computer program is executed by a processor to implement the method according to any one of the first aspect.

According to a fifth aspect, an embodiment of this application discloses a computer program product. When the computer program product is read and executed by a computer, the method according to any one of the first aspect is performed.

According to a sixth aspect, an embodiment of this application discloses a computer program. When the computer program is executed on a computer, the computer is enabled to implement the method according to any one of the first aspect.

In conclusion, compared with an existing technical solution in which a similar incident is recommended through single-dimension comparison, in this solution, the similar incident is recommended through multi-dimension similarity comparison, so that recommendation accuracy can be improved, and an effective reference is provided for resolving the to-be-processed incident. Therefore, network maintenance efficiency is improved.

BRIEF DESCRIPTION OF DRAWINGS

FIG. 4 is a schematic diagram of a historical-incident recommendation page according to an embodiment of this application;

FIG. 5 is a schematic diagram of another historical-incident recommendation page according to an embodiment of this application;

FIG. 6 is a schematic diagram of another historical-incident recommendation page according to an embodiment of this application;

DESCRIPTION OF EMBODIMENTS

Figure 1:
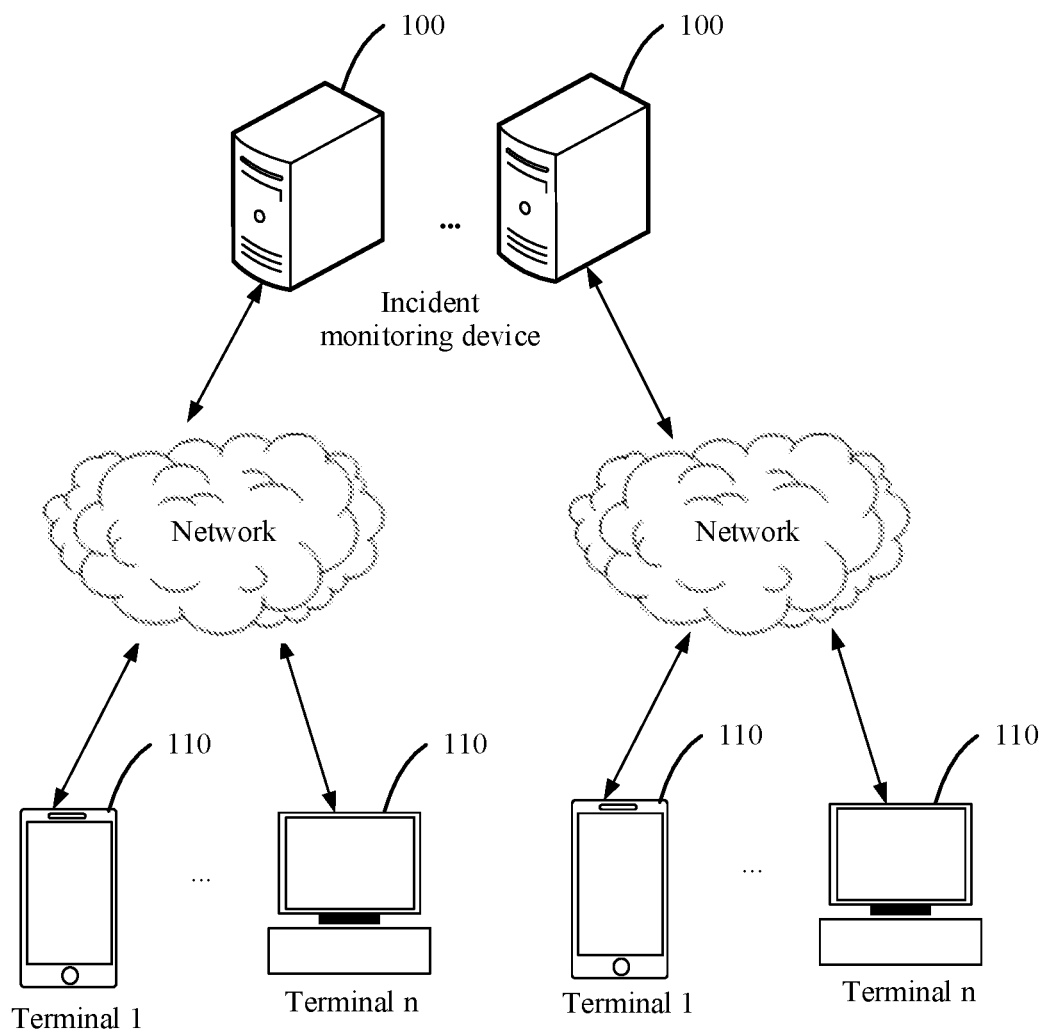
FIG. 1 is a schematic diagram of a system architecture of a method for recommending a similar incident according to an embodiment of this application.

To better understand a method for recommending a similar incident provided in embodiments of this application, the following first describes, by using an example, a scenario to which embodiments of this application are applicable. FIG. 1 is a schematic diagram of a system architecture to which a method for recommending a similar incident according to an embodiment of this application is applicable. As shown in FIG. 1, the system architecture may include one or more incident monitoring devices 100 (a plurality of devices may form a cluster) and one or more network nodes (or devices) 110. The incident monitoring device 100 and the network node 110 may communicate with each other by using a network.

The incident monitoring device 100 is a device mainly used to monitor whether an incident occurs between the network node 100 and a line in a network. For example, the incident monitoring device 100 may be a device used by an operator to monitor whether an incident occurs in a network, or may be a device used in an enterprise to monitor whether an incident occurs in a network of the enterprise. Specifically, a network in which the incident monitoring device 100 is located is determined based on an actual condition. This is not limited in this solution.

A corresponding application program needs to be run on the incident monitoring device 100 to provide a corresponding method for recommending a similar incident, for example, a database service, data calculation, or decision execution. For example, in this embodiment of this application, the incident monitoring device 100 may detect, by using an application program, that an incident occurs, and then recommend a similar historical incident for the new incident by using the application program, to quickly resolve the new incident with reference to a solution to the similar historical incident.

The network node 110 may be a device on a network side or a user side in the network in which the incident monitoring device 100 is located. The network node 110 may install and run a related application (APP). In this embodiment of this application, when an incident or an alarm occurs, the network node 110 may send incident information, alarm information, or the like to the incident monitoring device 100 by using the corresponding application.

The network node 110 may include but is not limited to any electronic product based on an intelligent operating system, for example, a smartphone, a tablet computer, a desktop computer, a hand-held computer, or a wearable electronic device, and may perform human-machine interaction with a user by using an input device such as a keyboard, a virtual keyboard, a touchpad, a touchscreen, or a voice-controlled device. The intelligent operating system includes but is not limited to any operating system that enriches functions of a device by providing various applications for the device, for example, a system such as Android, IOS, Windows, and MAC. The network node 110 may further include but is not limited to any network device in a network, for example, a network device such as a server, a hub, a switch, a bridge, a router, a gateway, a network interface card, a wireless access point, a printer, a modem, or an optical fiber transceiver.

It should be noted that the system architecture to which the method for recommending a similar incident provided in this embodiment of this application is applicable is not limited to the system architecture shown in FIG. 1.

Figure 2:
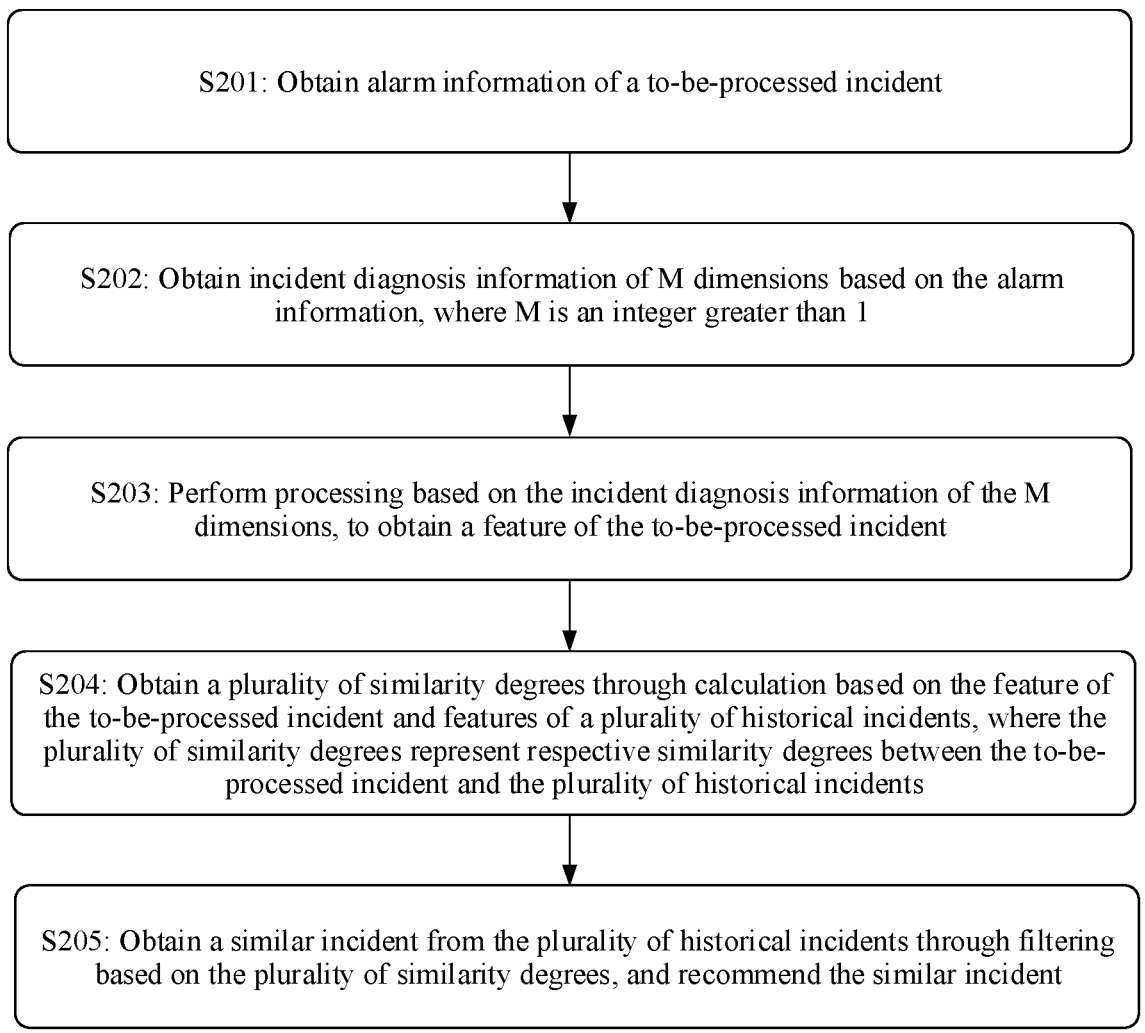
FIG. 2 is a schematic flowchart of a method for recommending a similar incident according to an embodiment of this application.

The following provides a method for recommending a similar incident, and the method may be applied to the system architecture shown in FIG. 1. Refer to FIG. 2. The method includes but is not limited to the following steps.

Step 201: Obtain alarm information of a to-be-processed incident.

In a specific embodiment, when an incident (where the incident may be referred to as the to-be-processed incident) occurs in a network, an alarm occurs in a network node. Then the network node sends, to an incident monitoring device based on an alarm condition, information such as an alarm list, a reason for which the alarm may occur, a location at which the alarm may occur, for example, a device or a port, and an incident rectification suggestion. The information obtained by the incident monitoring device may be referred to as the alarm information of the to-be-processed incident. The alarm information is mainly description information of the to-be-processed incident, and the information may further include other information such as a possible incident type. This is not limited in this solution.

Optionally, the incident monitoring device may obtain the alarm information of the to-be-processed incident by using a Kafka system. For example, the Kafka may receive the alarm information of the to-be-processed incident that is sent by a plurality of network nodes, and sequentially store the information. The incident monitoring device may subscribe to the information in a subscription manner, to obtain the alarm information of the to-be-processed incident.

Step 202: Obtain incident diagnosis information of M dimensions based on the alarm information.

First, a concept of a dimension is introduced. In a specific embodiment, an incident may be diagnosed from a plurality of perspectives, to quickly rectify the incident. The incident diagnosis perspectives may be referred to as dimensions. In this case, the M dimensions may include M different perspectives of incident diagnosis, and M is an integer greater than 1. Refer to Table 1. Some common incident diagnosis dimensions are listed below, but are actually not limited to the dimensions listed in Table 1.

TABLE 1

| Dimension | Dimension description | Method for comparing similarity between incidents in a single dimension |
|---|---|---|
| Network location | A user side and a network side | Determine whether the user side and the network side both exist. |
| Network | An access ring, an access chain, an | Determine whether the access |

TABLE 1-continued

| Dimension | Dimension description | Method for comparing similarity between incidents in a single dimension |
|---|---|---|
| ring/chain | aggregation ring, and a core ring | ring, the access chain, the aggregation ring, and the core ring all exist. |
| Protection type | A specific protection type, for example, non-protection, automatic protection switching (Automatic Protection Switching, APS) protection, and tunnel protection | Determine whether the non-protection, the automatic protection switching protection, and the tunnel protection all exist. |
| Service information | A specific related service and a service damage condition (interruption or degradation) | Determine whether a proportion of a quantity of same services to a total quantity reaches a specific proportion, for example, exceeds 60%. |
|  | A type of a specific related service and service damage distribution conditions | Determine whether the type of the specific related service and the |
| Dimension | Dimension description | Method for comparing similarity between incidents in a single dimension |
|  | corresponding to different service types | service damage distribution conditions corresponding to the different service types all exist. |
| Device log | Similar logs | Determine whether texts in the logs are similar. |
| Performance indicator data | Indicator trends are similar, such as smooth increase/decrease, rapid increase/decrease, cliff-like sudden decrease, up-down oscillation, and horizontal straightness/fluctuation | Determine whether trends are similar. For example, a trend of an incident A is first horizontal fluctuation and then sudden decrease, and a trend of an incident B is also first horizontal fluctuation and then sudden decrease. |
| Diagnostic command response | Similar responses | Determine whether texts in the responses are similar. |
| Alarm type | A line alarm, a device out-of-service alarm, a board alarm, a service alarm, a protection degradation alarm, an interruption alarm, a fan alarm, a temperature alarm, a traffic threshold-crossing alarm, an optical-function abnormality alarm, a bit error alarm, a switchover type alarm, and a backward-indication type alarm | Determine whether both incident alarm sets include one or more specific types of alarms. |

Table 1 lists the plurality of incident diagnosis dimensions as examples. The dimensions may include, for example, dimensions such as a network location, information about a network ring/chain, a protection type, service information, a device log, performance indicator data, a diagnostic command response, and an alarm type. Table 1 further provides some descriptions of each dimension and a method for comparing, in each dimension, similarity between incidents. Descriptions are provided in detail below.

The network location may include a network side, a user side, or the like. Whether two incidents may be similar may be determined based on network locations of the two incidents. If the locations in which the two incidents occur are both on the network side or the user side, the two incidents may be similar incidents.

The network ring/chain may include an access ring, an access chain, an aggregation ring, a core ring, and the like. Whether two incidents may be similar may be determined based on network rings/chains on which the two incidents occur. If the network rings/chains on which the two incidents occur are on a same ring/chain, for example, are both on a same access ring, the two incidents may be similar incidents. Alternatively, if the network rings/chains on which the two incidents occur are on rings/chains of a same type, for example, are both on access rings of a packet transport network (PTN) 950 type, but are not on a same access ring, the two incidents may also be similar incidents.

The protection type may include non-protection, APS protection, tunnel protection, and the like. The protection may be used to reduce or even avoid a loss on a network that is caused by an incident when the incident occurs in the network. Whether two incidents may be similar may be determined by determining whether there are protective measures of a corresponding type after the incidents occur. If there are protective measures of a same type, for example, APS protection or non-protection, after the two incidents occur, the two incidents may be similar incidents.

The service information includes two aspects. A first aspect includes a specific related service, a service damage condition, and the like. A second aspect includes a type of a specific related service, service damage distribution conditions corresponding to different service types, and the like.

In the first aspect, whether two incidents may be similar may be determined by calculating a proportion of a quantity of same services to a total quantity of services related to the two incidents. For example, a proportion threshold may be preset. When a ratio of the quantity of same services to the total quantity of related services is greater than the threshold, the two incidents may be similar incidents. For example, it is assumed that the threshold is 0.6, a first incident is related to 10 services, a second incident is related to 15 services, and eight of the services related to the two incidents are the same. In this case, a ratio of a quantity of same services to a total quantity of related services is (8+8)/(10+15)=0.64. The ratio is greater than the threshold 0.6, and therefore the two incidents may be similar incidents. In addition, a specific service damage condition, for example, service degradation or service interruption, may be alternatively considered for determining. If service damage conditions are the same, two incidents may be similar incidents.

In the second aspect, whether two incidents may be similar may be determined by comparing types of services related to the two incidents. If the types of the services related to the two incidents are the same or similar, the two incidents may be similar incidents. In addition, a damage distribution condition of a service type, for example, service damage rates corresponding to a same service type or similar service types, may be alternatively considered. If the service damage rates are similar, the two incidents may be similar incidents.

The device log is a log of a device related to an incident. Logs of devices related to two incidents may be compared to determine whether the two incidents may be similar. If the logs of the devices related to the two incidents are similar, the two incidents may be similar incidents.

The performance indicator data may include various parameter indicators for evaluating device performance or network performance, for example, a packet loss rate. Whether two incidents may be similar may be determined by comparing change trends or change developments of performance indicators of devices or networks related to the two incidents. A change trend or a change development of a performance indicator may include, for example, smooth increase/decrease, rapid increase/decrease, cliff-like sudden decrease, up-down oscillation, and horizontal straightness/fluctuation. For example, if packet loss rates of the devices related to the two incidents both increase rapidly, the two incidents may be similar incidents.

The diagnostic command response is a response condition of a device related to an incident to a diagnostic command. The diagnostic command includes a command for querying for an overall running status of the device, and the like. Whether two incidents may be similar may be determined by comparing response information of devices related to the two incidents to a same diagnostic command. If the response information of the two devices is similar or the same, the two incidents may be similar.

Generally, there are a large quantity of alarms. Operations personnel habitually classifies the alarms. Common alarm types include a line alarm, a device out-of-service alarm, a board alarm, a service alarm, a protection degradation alarm, an interruption alarm, a fan alarm, a temperature alarm, a traffic threshold-crossing alarm, an optical-function abnormality alarm, a bit error alarm, a switchover type alarm, a backward-indication type alarm, and the like. Whether two incidents may be similar may be determined by comparing alarm types of alarm information corresponding to the two incidents. If the alarm types corresponding to the two incidents are similar or the same, the two incidents may be similar.

It should be noted that a part of the information about the plurality of dimensions, for example, the alarm type, may be obtained from a network node, and a part of the information, for example, the service information and the device log, may be obtained by an incident monitoring device through querying based on the alarm information. A part of the information, for example, the network location and the network ring/chain, may alternatively be obtained through determining based on existing information. Specifically, obtaining of the information is determined based on an actual situation, and is not limited in this solution.

In addition, the method for comparing similarity between incidents that is described in Table 1 is incident similarity comparison implemented in a single dimension. A similar incident obtained through the incident similarity comparison implemented in a single dimension may have a large deviation, and is of little reference significance. Therefore, this solution provides incident similarity comparison implemented in a plurality of dimensions, to reduce a deviation between a similar incident obtained through comparison and a to-be-processed incident, and improve accuracy of recommending the similar incident, so as to provide effective reference information for operations personnel.

Based on the descriptions of the foregoing dimensions, the following describes obtaining incident diagnosis information of M dimensions based on the alarm information.

In a specific embodiment, after obtaining the alarm information, the incident monitoring device may obtain, based on the alarm information, incident diagnosis information of the to-be-processed incident in each dimension, for example, may obtain incident diagnosis information in the plurality of dimensions in Table 1. The incident diagnosis information includes information for actually describing the to-be-processed incident in each dimension, for example, may be the information in the dimension descriptions in Table 1, and can be used to obtain, through diagnosis, an incident type of the to-be-processed incident and a specific location of the incident. For example, the dimension of the network location is used as an example. If the to-be-processed incident occurs on the network side, the network side is incident diagnosis information of the to-be-processed incident in the dimension of the network location.

The alarm information includes the information such as the alarm list, the reason for which the alarm may occur, the location at which the alarm may occur, for example, a device or a port, and the incident rectification suggestion. Therefore, the incident monitoring device may obtain, based on the information, the incident diagnosis information of the to-be-processed incident in each dimension. For example, a specific alarm type may be determined based on the alarm list. A specific network location may be determined based on the location at which the alarm may occur. For example, whether the alarm is on the network side or the user side may be determined. A database may further be queried based on the alarm information, to obtain incident diagnosis information in a corresponding dimension. For example, specific service information and a specific device log that are related to the to-be-processed incident are obtained through querying. Descriptions are provided by using the examples herein. Specifically, obtaining of the incident diagnosis information in the dimensions is determined based on an actual situation, and is not limited in this solution.

After obtaining the incident diagnosis information of the to-be-processed incident in each dimension, the incident monitoring device may further determine the M dimensions used for similarity calculation. For example, the following describes two manners of determining the M dimensions.

Manner 1: The incident monitoring device may determine, based on the received alarm information, a network type of a network in which the to-be-processed incident is located, and then may determine the M dimensions based on the network type of the network in which the to-be-processed incident is located. Specifically, different network types may correspond to different M dimensions. Certainly, different network types may alternatively correspond to same M dimensions. Details are specifically determined based on an actual situation.

Optionally, the M dimensions corresponding to different network types may be preconfigured. For example, for two types of networks, namely, a packet transport network PTN and an optical transport network (OTN), M dimensions corresponding to the PTN network may be preconfigured, including a network location, a network ring/chain, service information, and an alarm type. M dimensions corresponding to the OTN network may be preconfigured, including a network location, a network ring/chain, service information, performance indicator data, and an alarm type. The network types described herein are only examples, and there is another network type. Specific network classification is not limited, and is specifically determined based on an actual situation. Then, for various classified network types, M dimensions corresponding to each network type may be preconfigured.

Optionally, after determining the network type of the network in which the to-be-processed incident is located, the incident monitoring device may adaptively select, from a preset dimension list such as Table 1 based on a feature of the network type, M dimensions as dimensions for comparing similar incidents. A specific dimension to be selected may be determined based on the feature of the network type. This is not limited in this solution.

Manner 2: The M dimensions may not be determined based on the network type of the network in which the incident is located, but M preset dimensions are uniformly used as dimensions for comparing similar incidents. For example, regardless of the network type, the following dimensions are used as dimensions for comparing similar incidents: a network location, a network ring/chain, a protection type, service information, a device log, performance indicator data, a diagnostic command response, and an alarm type.

Alternatively, the M dimensions may be determined based on the foregoing obtained alarm information. For example, the information includes the alarm list and the location at which the alarm may occur, for example, a device or a port. An alarm type may be determined based on the alarm list, and a network location may be determined based on the location at which the alarm may occur, for example, the network side or the user side. In this case, the incident monitoring device may use two dimensions, namely, the network location and the alarm type, as dimensions for comparing similar incidents. Certainly, descriptions are provided by using only the examples. Information specifically included in the alarm information and a dimension determined based on the information are determined based on an actual situation. This is not limited in this solution.

It should be noted that regardless of the plurality of incident diagnosis information preset based on the network type, the unified M dimensions, or the M dimensions determined based on the alarm information, a quantity of dimensions may be properly adjusted based on an actual requirement, for example, the preset dimensions are added, deleted, or modified. A specific dimension to be added, reduced, or modified is determined based on an actual situation. This is not limited in this solution.

After determining the M dimensions, the incident monitoring device may select the incident diagnosis information of the M dimensions from the incident diagnosis information that is of the to-be-processed incident in each dimension and that is obtained based on the alarm information.

Optionally, in the foregoing descriptions, the incident monitoring device first obtains the incident diagnosis information of the to-be-processed incident in each dimension based on the alarm information, then determines the M dimensions, and then selects the incident diagnosis information of the M dimensions from the incident diagnosis information in each dimension. However, in an actual implementation, the incident monitoring device may alternatively first determine the M dimensions based on the alarm information, and then obtain the incident diagnosis information of the M dimensions for the M dimensions based on the alarm information. It should be noted that a specific implementation is determined based on an actual situation. This is not limited in this solution.

Step 203: Perform processing based on the incident diagnosis information of the M dimensions, to obtain a feature of the to-be-processed incident.

After determining the incident diagnosis information of the M dimensions, the incident monitoring device may perform processing based on the incident diagnosis information of the M dimensions, to obtain the feature of the to-be-processed incident. A specific processing process may include performing feature extraction on each of the M dimensions and combining features extracted from all the M dimensions into the feature of the to-be-processed incident. The following describes, by using an example, a process of performing processing based on the incident diagnosis information of the M dimensions, to obtain the feature of the to-be-processed incident.

First, numeralization of the incident diagnosis information of the M dimensions is described. Numeralization of information, to put it simply, may be using a number to represent specific text information. For example, for the dimension of the network location, the network location includes the user side and the network side. After information of the dimension of the network location is numeralized, a number such as 0 may be used to represent the user side, and another number such as 1 may be used to represent the network side. For another example, for the dimension of the network ring/chain, the network ring/chain includes the access ring, the access chain, the aggregation ring, and the core ring. After information of the dimension of the network ring/chain is numeralized, 0, 1, 2, and 3 may be respectively used to represent the access ring, the access chain, the aggregation ring, and the core ring. For numeralization of another dimension, refer to the numeralization examples of the two dimensions. Details are not described herein. It should be noted that a specific number used to numeralize information of a dimension is determined based on an actual situation. This is not limited in this solution.

After the information of the dimension is numeralized, there is an association mapping relationship between the information of each dimension and numeralized data of each dimension. For example, for the foregoing dimension of the network location, there is association mapping between the user side and the number 0 and an association mapping between the network side and the number 1.

Because the incident diagnosis information of the M dimensions has been obtained, when the feature of the to-be-processed incident in each of the M dimensions needs to be extracted, a number corresponding to the incident diagnosis information in each of the M dimensions is obtained through querying based on a corresponding association relationship, and the number is used as a feature value of the corresponding dimension. For ease of understanding, an example is used for description.

It is assumed that the three dimensions, namely, the network location, the network ring/chain, and the alarm type, are determined as the dimensions for comparing similar incidents, and obtained incident diagnosis information of the to-be-processed incident in the dimensions of the network location, the network ring/chain, and the alarm type is respectively a network side, a core ring, and a line alarm. Therefore, based on association mapping relationships after numeralization, it can be learned that a numeralized number of the network side is 1, a numeralized number of the core ring is 3, and a numeralized number of the line alarm is 0. Therefore, it can be learned that feature values of the to-be-processed incident in the dimensions of the network location, the network ring/chain, and the alarm type are respectively 1, 3, and 0.

After the feature values of the M dimensions are obtained, the feature values may be combined into a feature vector, and the feature vector may be referred to as the feature of the to-be-processed incident. For example, in the example in the previous paragraph, the feature values of the to-be-processed incident in the dimensions of the network location, the network ring/chain, and the alarm type are respectively 1, 3, and 0. In this case, these feature values may be combined into a feature vector A=[1, 3, 0]. Certainly, the vector A may alternatively be represented as [3, 1, 0], or the like. In other words, a sequence of the feature values corresponding to the M dimensions may be determined based on an actual situation. This is not limited in this solution.

Step 204: Obtain a plurality of similarity degrees through calculation based on the feature of the to-be-processed incident and features of a plurality of historical incidents, where the plurality of similarity degrees represent respective similarity degrees between the to-be-processed incident and the plurality of historical incidents.

In a specific embodiment, a database of the incident monitoring device stores information about historical incidents. The information about the historical incidents may include information that corresponds to each historical incident and that is in a plurality of dimensions, detailed information about a solution corresponding to each historical incident, and the like.

After determining the M dimensions, the incident monitoring device may obtain, from the database, the information about each historical incident, and extract a feature of each historical incident based on the determined M dimensions. A manner of extracting the feature of the historical incident is the same as a manner of extracting the feature of the to-be-processed incident. For details, refer to the foregoing corresponding descriptions. Details are not described herein again. It should be noted that when extracted feature values that correspond to the historical incident and that are in the dimensions are combined into a feature vector, a combination sequence of the feature values is the same as a combination sequence of the feature values corresponding to the to-be-processed incident. For ease of understanding, an example is used for description.

Still using the example in which the M dimensions are three dimensions, namely, the network location, the network ring/chain, and the alarm type, the feature vector obtained by combining the feature values of the to-be-processed incident in the plurality of dimensions is A=[1, 3, 0], which is combined in a sequence of the network location, the network ring/chain, and the alarm type. In this case, it is assumed that extracted features of a historical incident in the three dimensions, namely, the network location, the network ring/chain, and the alarm type, are respectively the network side, the core ring, and a device out-of-service alarm. Similarly, the numeralized numbers associated with the network side and the core ring in a mapping manner are still 1 and 3 respectively, and a numeralized number associated with the device out-of-service alarm in the mapping manner is 1. In this case, combining is performed based on the sequence of the network location, the network ring/chain, and the alarm type, to obtain a feature vector B=[1, 3, 1] of the historical incident. In other words, the sequences of the feature value combinations corresponding to the two incidents on which similarity comparison needs to be performed need to be the same.

After obtaining the feature vector of each historical incident in the database through extracting, the incident monitoring device separately calculates similarity between the feature vector of the to-be-processed incident obtained through extracting and the feature vector of each historical incident, to obtain the plurality of similarity degrees.

Optionally, the similarity between the to-be-processed incident and the historical incident may be calculated by using an algorithm such as cosine similarity or a term frequency-inverse document frequency (TF-IDF) index. It should be noted that there are many algorithms used for calculating the similarity between the to-be-processed incident and the historical incident, and any feasible similarity calculation algorithm may be used. This is not limited in this solution. The following uses the cosine similarity algorithm as an example to describe similarity calculation between the to-be-processed incident and the historical incident.

Figure 3:
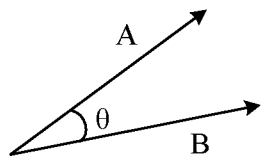
FIG. 3 is a schematic diagram of a cosine angle according to an embodiment of this application.

A principle of the cosine similarity algorithm is that two feature vectors are used as two line segments in space, and the two line segments both start from an origin and point to different directions, that is, an included angle is formed between the two line segments. For example, refer to FIG. 3. For example, FIG. 3 is a schematic diagram of two feature vectors, namely, a feature vector A and a feature vector B. The two vectors start from a same point and point to different directions, and an included angle between the two vectors is 0. A smaller included angle indicates that the directions of the two feature vectors are closer, that is, the two vectors are more similar. An example is used for description below based on FIG. 3 and the foregoing examples.

Refer to the foregoing examples. It is assumed that the feature vector of the to-be-processed incident is A=[1, 3, 0], and the feature vector of the historical incident is B=[1, 3, 1]. First, a calculation formula for calculating a cosine value of an included angle between the two feature vectors is as follows:

$$\cos\theta = \frac{1*1 + 3*3 + 0*1}{\sqrt{1^2 + 3^2 + 0^2} * \sqrt{1^2 + 3^2 + 1^2}} \approx 0.95$$

When the cosine value is closer to 1, it indicates that the included angle is closer to 0 degrees, that is, it indicates that the two vectors are similar. Therefore, the cosine value of the included angle between the two vectors may be used as a similarity degree between the two vectors. A similarity degree between the vector A and the vector B may be 0.95 or 95%. Because the vector A represents the to-be-processed incident, and the vector B represents a historical incident, a similarity degree between the to-be-processed incident and the historical incident is 95%. Based on the algorithm, similarity degrees between the to-be-processed incident and the historical incidents in the database may be obtained through calculation, to obtain the plurality of similarity degrees.

In another possible implementation, because there are a large quantity of historical incidents in the database, if similarity calculation is separately performed between the to-be-processed incident and all the historical incidents in the database, a large quantity of calculation resources and a long time need to be consumed. Therefore, to save resources and improve efficiency, a part of the historical incidents may be selected from the historical incidents in the database, and then only similarity degrees between the to-be-processed incident and the selected historical incidents need to be calculated. This saves calculation resources and improves efficiency, and a user requirement can be responded to more quickly.

Optionally, in a specific implementation, information about the historical incident is stored in the database of the incident monitoring device, and the information further includes an evaluation of a user on a solution to a corresponding historical incident and/or an evaluation of the user on the incident. Then, the incident monitoring device may obtain, through filtering based on the evaluation information, the historical incident used to perform similarity calculation with the to-be-processed incident.

For example, filtering may be performed based on the evaluation of the user on the solution to the corresponding historical incident. If the evaluation indicates that the solution is useful and can well rectify the incident, the historical incident corresponding to the evaluation may be selected as the historical incident for performing similarity calculation with the to-be-processed incident. If an evaluation on a solution to a historical incident is poor, the historical incident is not used to perform similarity calculation with the to-be-processed incident.

For another example, filtering may be performed based on the evaluation of the user on the incident. If the evaluation indicates that the incident is a common incident, the historical incident corresponding to the evaluation may be selected as the historical incident for performing similarity calculation with the to-be-processed incident. If the evaluation indicates that the incident does not affect processing of any service, for example, the incident occurs on some unused ports or devices on the user side, the incident corresponding to the evaluation may not be used to perform similarity calculation with the to-be-processed incident.

Certainly, filtering may alternatively be performed based on the foregoing two evaluations. Details are not described again.

Step 205: Obtain a similar incident from the plurality of historical incidents through filtering based on the plurality of similarity degrees, and recommend the similar incident.

In a specific implementation, after obtaining the plurality of similarity degrees between the to-be-processed incident and the historical incidents that participate in the similarity calculation, the incident monitoring device may sort the similarity degrees in descending order, then obtain, through filtering, historical incidents associated with top N similarity degrees, and recommend the historical incidents to the user. The N historical incidents may be referred to as similar incidents of the to-be-processed incident. The following describes, by using examples, two manners of recommending the historical incident.

Manner 1: The top N similarity degrees are all greater than a preset threshold. For example, it is assumed that the preset threshold is 50%, and the plurality of similarity degrees obtained through calculation are 95%, 80%, 65%, 57%, and 20%. After the similarity degrees are compared with the threshold, historical incidents associated with the similarity degrees 95%, 80%, 65%, and 57% may be recommended to the user. For example, refer to FIG. 4.

For example, FIG. 4 is a schematic diagram of a page for recommending the top N historical incidents. The recommendation page may include information such as a similarity degree, an incident level, an incident number, an incident type, a maintenance suggestion, an incident status, and corresponding creation time. Certainly, the page is not limited to the information, and may further include other information such as a quantity of alarms, a quantity of affected services, and a network location. Specific included information is determined based on a specific condition. A maintenance suggestion provided for each recommended incident in FIG. 4 may be a suggestion provided based on an actual solution to a corresponding historical incident. A specific maintenance suggestion may be displayed in response to a click operation on a view control 401. Certainly, optionally, details of the maintenance suggestion may alternatively be directly displayed in FIG. 4, and the view control 401 is not required.

Optionally, in FIG. 4, an actual solution corresponding to each historical incident may be alternatively displayed for user reference. Alternatively, the incident monitoring device may provide the user with a query entrance of the actual solution to the recommended historical incident, and the user may query for, based on the recommended historical incident, the actual solution to the historical incident for reference, so that efficiency of processing the to-be-processed incident is greatly improved.

In addition, in FIG. 4, a reason for which each historical incident is recommended may further be viewed in the recommendation page. For example, the recommendation reason is displayed on the page by using a control 402, and the recommendation reason may include content of a part such as similarity-degree analysis and processing-experience similarity analysis.

Manner 2: A value of N is preset. For example, the value of N may be preset to 10, 15, or 20. To be specific, the foregoing obtained plurality of similarity degrees are sorted in descending order, and the historical incidents associated with the top N similarity degrees, such as top 10 similarity degrees, top 15 similarity degrees, or top 20 similarity degrees, are selected and recommended to the user. The specific value of N is not limited in this solution.

In a possible implementation, after completing recommendation of the historical incident, the incident monitoring device may further receive evaluation information of the user on the recommended historical incident. The evaluation information may be used as reference information for subsequent historical-incident recommendation.

Optionally, the user may evaluate the recommended historical incident by using an action such as "like" or "dislike". "Like" indicates that the user is satisfied with the recommended historical incident and gives a positive comment. "Dislike" indicates that the user is not satisfied with the recommended historical incident and gives a negative comment.

Optionally, the user may alternatively evaluate the recommended historical incident in a manner of scoring, giving a "star", or the like. For the manner of scoring, a full score may be 10 points or 100 points, and a higher score indicates higher satisfaction. For the manner of giving a "star", there are five stars in total. More given stars indicate higher satisfaction.

Certainly, the user may alternatively evaluate the recommended historical incident in another manner. This may be determined based on an actual situation.

After receiving the evaluation information of the user, the incident monitoring device associates the evaluation information with a corresponding historical incident, and performs counting, that is, records quantities of positive comments and negative comments corresponding to the historical incident. Then, in the subsequent historical-incident recommendation, a historical incident with good evaluation, for example, a historical incident with a large quantity of positive comments, may be displayed in the front of the recommendation page, and a historical incident with a poor evaluation, for example, a historical incident with no positive comments or with a large quantity of negative comments, may be displayed at the back of the recommendation page, or even is not recommended. For example, descriptions are provided below by using an example in which the evaluation manner is the manner of "like". Refer to FIG. 5.

Compared with FIG. 4, a page for recommending a historical incident shown in FIG. 5 further includes a quantity 501 of likes given to the historical incident and an example 502 of an operation used to give a like. It can be learned that a historical incident with more likes is displayed more front in the recommendation page. To be specific, the incident monitoring device sorts and displays the historical incidents from top to bottom in the recommendation page in descending order of quantities of likes for the recommended historical incidents. In addition, the example 502 of the operation used to give a like in FIG. 5 is used by the user to give a like, and the incident monitoring device may receive like information of the user from the example 502 of the operation used to give a like.

In this embodiment of this application, the historical incident is recommended with reference to the evaluation of the user, so that a more accurate recommendation can be provided for the user with reference to a feedback of the user, to further improve the efficiency of processing the to-be-processed incident.

In a possible implementation, the incident monitoring device may alternatively compare the to-be-processed incident and the historical incident in a single dimension based on the M dimensions. Then, when the user needs to learn comparison details in the single dimension, the incident monitoring device may also display, on an interface of a display screen, result details of comparison in the single dimension for the user to read for reference. For ease of understanding, an example is used below for description.

For example, the foregoing M dimensions are three dimensions, namely, the network location, the network ring/chain, and the alarm type. It is assumed that extracted features of the to-be-processed incident in the dimensions of the network location, the network ring/chain, and the alarm type are respectively the network side, the core ring alarm, and the line alarm, and extracted features of a historical incident in the dimensions of the network location, the network ring/chain, and the alarm type are respectively the network side, the core ring alarm, and the device out-of-service alarm. In this case, for example, a result of comparing the to-be-processed incident and the historical incident in a single dimension based on the three dimensions may be: Both the two incidents relate to the network side and the core ring, but the alarm type of the to-be-processed incident relates to the link alarm, and the alarm type of the historical incident relates to the device out-of-service alarm. Then the comparison details are displayed to the user when required by the user. For example, refer to FIG. 6.

It can be learned from FIG. 6 that the to-be-processed incident is an incident whose number is 150672, and an incident similar to the to-be-processed incident 150672 is a historical incident 984. For example, FIG. 6 provides related information about the to-be-processed incident 150672, for example, an incident type, an alarm quantity, a type of an affected service, a protection type, a quantity of affected services, and time at which the incident is created. Then, in a similar incident, an incident number, an incident diagnosis dimension, and similarity comparison details of a similar historical incident, a severity level and creation time of the historical incident, and the like are provided. Information in the incident diagnosis dimension indicates that the to-be-processed incident 150672 and the historical incident 984 are compared mainly from three dimensions, namely, the network location, the network ring/chain, and the alarm type. The similarity comparison details provide single-dimension comparison details of the three dimensions. For example, "both the two incidents relate to the network side and the core ring, but the incident 150672 relates to the link alarm, and the incident 984 relates to the device out-of-service alarm".

In this embodiment of this application, the single-dimension comparison details are provided, to help the user quickly find, based on the details, a solution for resolving the to-be-processed incident, so that resolving efficiency is further improved.

Figure 7:
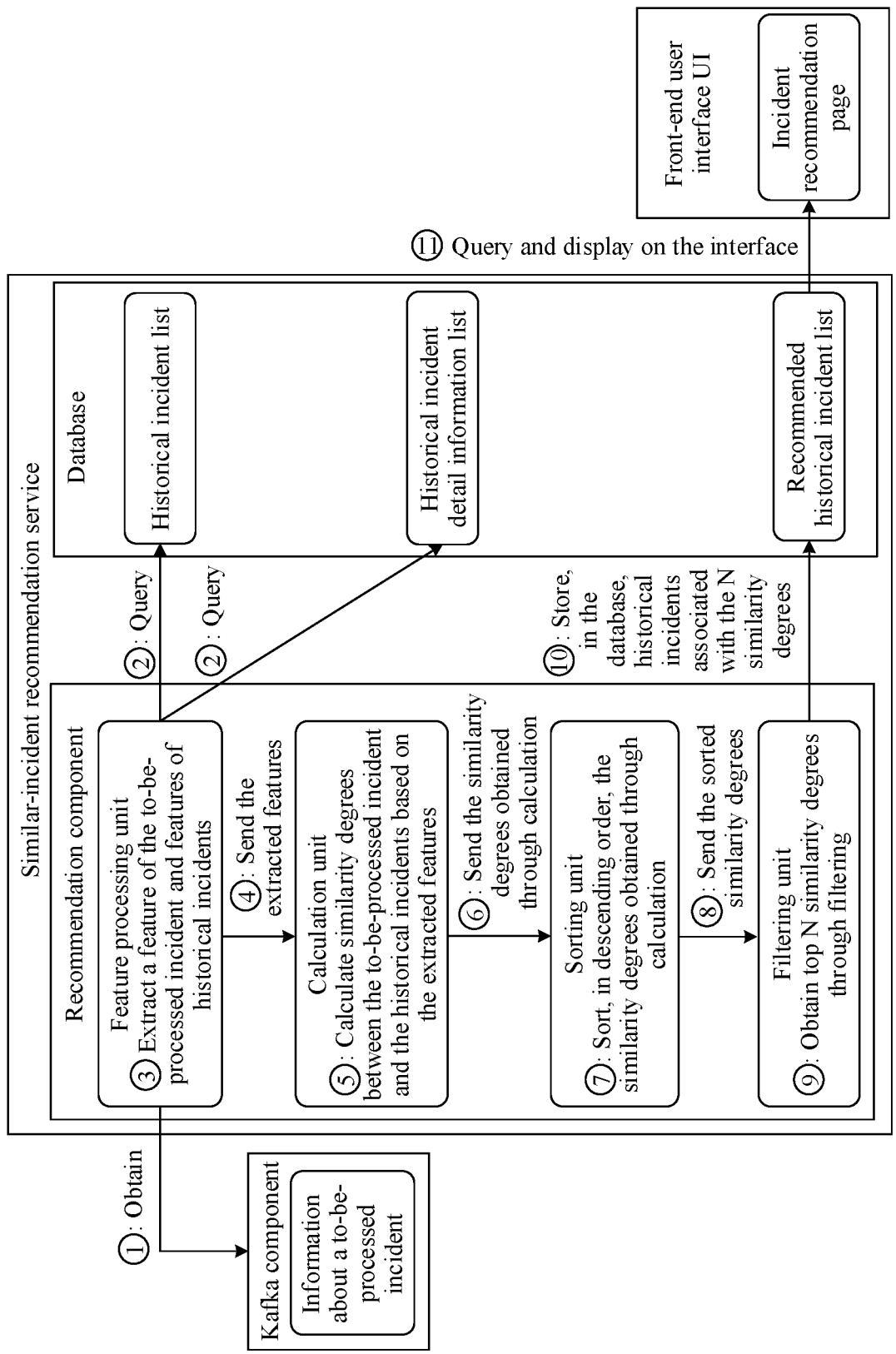
FIG. 7 is another schematic flowchart of a method for recommending a similar incident according to an embodiment of this application.

To facilitate understanding the method for recommending a similar incident provided in this application, the following describes an example with reference to FIG. 7.

FIG. 7 is a schematic diagram of a software architecture used to recommend a similar incident in an incident monitoring device. For example, FIG. 7 further shows a procedure of recommending a similar incident based on the software architecture. It may be learned that the incident monitoring device includes a front-end user interface (UI) of a similar-incident recommendation service. The recommendation service may include a recommendation component and a database, and the recommendation component may further include a feature processing unit, a calculation unit, a sorting unit, a filtering unit, and the like. The database may be configured to store a list of historical incidents, a list of historical incident detailed information, and a list of recommended historical incidents. The procedure of recommending a similar incident based on the software architecture includes but is not limited to the following steps.

①: The feature processing unit obtains alarm information from a Kafka component.

②: The feature processing unit then obtains, through querying from the list of historical incidents and the list of historical incident detailed information in the database, historical incidents used for similarity comparison and detailed information of the historical incidents.

③: The feature processing unit performs processing based on the information obtained in steps ① and ②, to obtain a feature of a to-be-processed incident and features of the historical incidents.

④: The feature processing unit sends, to the calculation unit, the feature of the to-be-processed incident and the features of the historical incidents that are obtained through processing.

⑤: The calculation unit calculates similarity degrees between the to-be-processed incident and the historical incidents based on the features obtained through processing.

⑥: The calculating unit sends, to the sorting unit, the similarity degrees obtained through calculation.

⑦: The sorting unit sorts, in descending order, the similarity degrees obtained through calculation.

⑧: The sorting unit sends the sorted similarity degrees to the filtering unit.

⑨: The filtering unit obtains top N similarity degrees from the sorted similarity degrees through filtering.

⑩: The filtering unit stores, in the database, historical incidents associated with the N similarity degrees, to obtain the list of recommended historical incidents.

⑪: The front-end user interface UI then queries the list of recommended historical incidents in the database, and displays information about the list on the user interface.

For a specific implementation of the foregoing steps, refer to corresponding descriptions in the foregoing method embodiment in FIG. 2, and details are not described herein again.

In conclusion, compared with an existing technical solution in which a similar incident is recommended through single-dimension comparison, in this solution, the similar incident is recommended through multi-dimension similarity comparison, so that recommendation accuracy can be improved, and an effective reference is provided for resolving the to-be-processed incident. Therefore, network maintenance efficiency is improved.

The foregoing mainly describes the method that is for recommending a similar incident and that is provided in embodiments of this application. It may be understood that, to implement the foregoing functions, each device includes corresponding hardware structures and/or software modules for performing corresponding functions. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the incident monitoring device may be divided into function modules based on the foregoing method examples. For example, each function module may be obtained through division based on each corresponding function, or two or more functions may be integrated into one module. The integrated module may be implemented in a form of hardware, or may be implemented in a form of a software functional module. It should be noted that, in embodiments of this application, division into modules is an example, and is merely a logical function division. In an actual implementation, another division manner may be used.

Figure 8:
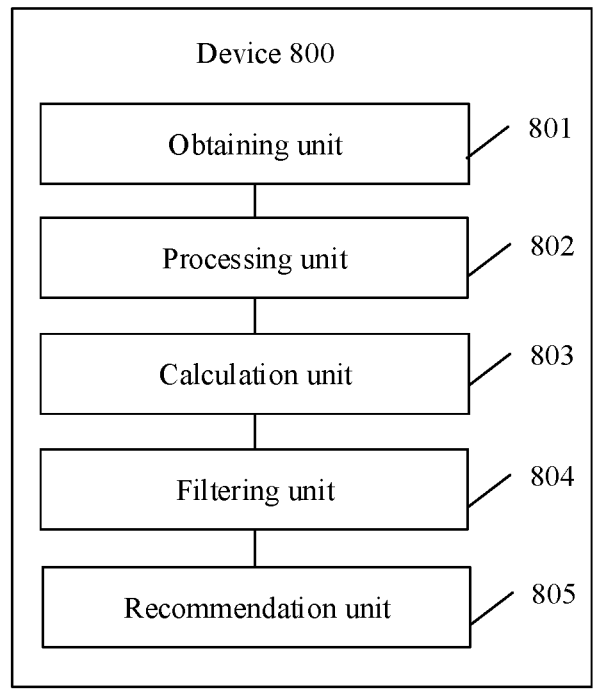
FIG. 8 is a schematic diagram of a logical structure of a device according to an embodiment of this application.

When each function module is obtained through division based on each corresponding function, FIG. 8 is a schematic diagram of a possible logical structure of a device. The device may be the foregoing incident monitoring device. The device 800 includes an obtaining unit 801, a processing unit 802, a calculation unit 803, a filtering unit 804, and a recommendation unit 805.

For example, the obtaining unit 801 is configured to perform the step of obtaining information in the foregoing method embodiment, for example, configured to perform the step of obtaining the alarm information and the incident diagnosis information. The processing unit 802 is configured to perform the step of performing processing based on the incident diagnosis information of the M dimensions, to obtain the feature of the to-be-processed incident in the foregoing method embodiment. The calculation unit 803 is configured to perform the step of similarity calculation in the foregoing method embodiment. The filtering unit 804 is configured to perform the step of filtering in the foregoing method embodiment, for example, configured to perform the step of obtaining the similar historical incident through filtering. The recommendation unit 805 is configured to perform the step of recommendation in the foregoing method embodiment, for example, configured to perform the step of recommending the similar historical incident.

Optionally, the device 800 further includes a determining unit, configured to perform the step of determining the M dimensions in the foregoing method embodiment.

Optionally, the device 800 further includes an adjustment unit, configured to perform the step of adjusting the dimension in the foregoing method embodiment.

Optionally, the device 800 further includes a receiving unit, configured to perform the step of receiving the evaluation information in the foregoing method embodiment.

For specific operations and beneficial effects of the units in the device shown in FIG. 8, refer to the descriptions of the method embodiment shown in FIG. 2. Details are not described herein again.

Figure 9:
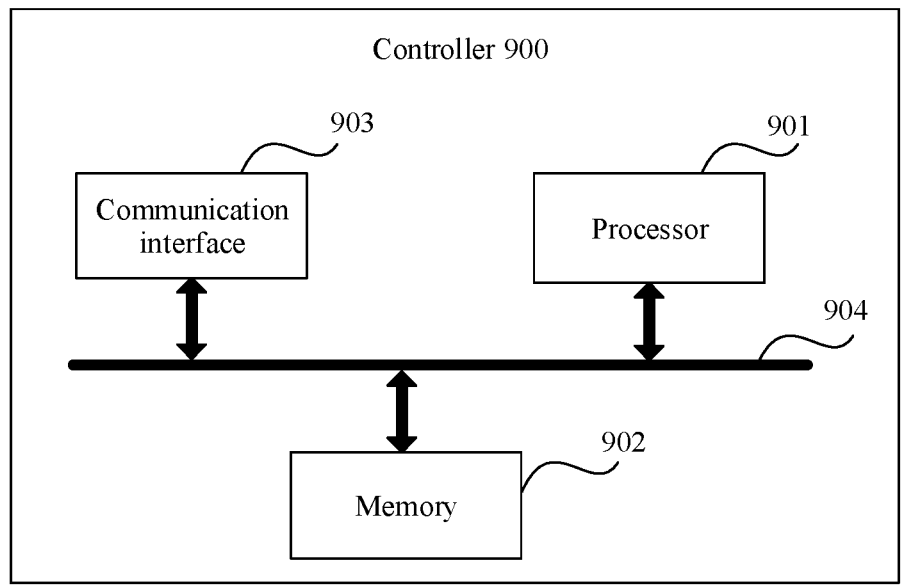
FIG. 9 is a schematic diagram of a hardware structure of a device according to an embodiment of this application.

FIG. 9 is a schematic diagram of a possible hardware structure of a device according to this application. The device may be the incident monitoring device described in the foregoing method embodiment. The device 900 includes a processor 901, a memory 902, and a communication interface 903. The processor 901, the communication interface 903, and the memory 902 may be connected to each other, or may be connected to each other by using a bus 904.

For example, the memory 902 is configured to store a computer program and data of the device 900. The memory 902 may include but is not limited to a random access memory (RAM), a read-only memory (ROM), an erasable programmable read-only memory (EPROM), a portable read-only memory (compact disc read-only memory, CD-ROM), and the like. The communication interface 903 is configured to support the device 900 in performing communication, for example, receiving or sending data.

For example, the processor 901 may be a central processing unit, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors, or a combination of the digital signal processor and a microprocessor. The processor 901 may be configured to read the program stored in the memory 902, to perform the operations performed by the incident monitoring device in the method described in FIG. 2 and the possible implementations.

An embodiment of this application further discloses a computer-readable storage medium. The computer-readable storage medium stores a computer program, and the computer program is executed by a processor to implement the method in FIG. 2 and the possible implementations.

An embodiment of this application further discloses a computer program product. When the computer program product is read and executed by a computer, the method in FIG. 2 and the possible implementations is performed.

An embodiment of this application further discloses a computer program. When the computer program is executed on a computer, the computer is enabled to implement the method in FIG. 2 and the possible implementations.

In conclusion, compared with an existing technical solution in which a similar incident is recommended through single-dimension comparison, in this solution, the similar incident is recommended through multi-dimension similarity comparison, so that recommendation accuracy can be improved, and an effective reference is provided for resolving the to-be-processed incident. Therefore, network maintenance efficiency is improved.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method for recommending a similar incident, wherein the method is applied to a computer device and comprises:
   obtaining alarm information of a to-be-processed incident;
   obtaining incident diagnosis information of M dimensions based on the alarm information, wherein the M dimensions comprise M different perspectives of incident diagnosis, and M is an integer greater than 1;
   performing processing based on the incident diagnosis information of the M dimensions, to obtain a feature of the to-be-processed incident;
   determining a plurality of similarity degrees based on the feature of the to-be-processed incident and features of a plurality of historical incidents, wherein the plurality of similarity degrees represent respective similarity degrees between the to-be-processed incident and the plurality of historical incidents; and
   obtaining the similar incident from the plurality of historical incidents through filtering based on the plurality of similarity degrees, and recommending the similar incident.

2. The method according to claim 1, wherein after the obtaining the alarm information of the to-be-processed incident and before the obtaining the incident diagnosis information of the M dimensions based on the alarm information, the method further comprises:
   obtaining, based on the alarm information, a network type of a network in which the to-be-processed incident is located; and
   determining the M dimensions based on the network type.

3. The method according to claim 1, wherein the performing the processing based on the incident diagnosis information of the M dimensions, to obtain the feature of the to-be-processed incident comprises:
   performing feature extraction on each of the M dimensions based on the incident diagnosis information of the M dimensions, to obtain a feature value of each dimension; and
   combining the feature values of all the M dimensions, to obtain the feature of the to-be-processed incident, wherein the feature of the to-be-processed incident is a feature vector.

4. The method according to claim 1, wherein before the obtaining the incident diagnosis information of the M dimensions based on the alarm information, the method further comprises: adjusting one or more dimensions in one or more preset dimensions, to obtain the M dimensions.

5. The method according to claim 1, wherein the obtaining the similar incident from the plurality of historical incidents through filtering based on the plurality of similarity degrees, and recommending the similar incident comprises:
   obtaining N historical incidents from the plurality of historical incidents through filtering based on the plurality of similarity degrees, and recommending the N historical incidents, wherein the N historical incidents are historical incidents associated with top N similarity degrees in the plurality of similarity degrees, the plurality of similarity degrees are sorted in a descending order, and N is a positive integer.

6. The method according to claim 1, wherein after the obtaining the similar incident from the plurality of historical incidents through filtering based on the plurality of similarity degrees, the method further comprises:
   recommending comparison information between the similar incident and the to-be-processed incident, wherein the comparison information comprises a condition of comparison between the similar incident and the to-be-processed incident in each of the M dimensions.

7. The method according to claim 1, wherein the plurality of historical incidents are incidents obtained from a database through filtering.

8. The method according to claim 1, wherein after the obtaining the similar incident from the plurality of historical incidents through filtering based on the plurality of similarity degrees, and recommending the similar incident, the method further comprises:
   receiving evaluation information for a recommended historical incident, wherein the evaluation information is used as reference information for subsequent historical-incident recommendation.

9. A device comprising a processor and a memory, the memory is configured to store a computer program and/or data, and the processor is configured to execute the computer program stored in the memory, to enable the device to perform operations including:
   obtaining alarm information of a to-be-processed incident;
   obtaining incident diagnosis information of M dimensions based on the alarm information, wherein the M dimensions comprise M different perspectives of incident diagnosis, and M is an integer greater than 1;
   performing processing based on the incident diagnosis information of the M dimensions, to obtain a feature of the to-be-processed incident;
   obtaining a plurality of similarity degrees based on the feature of the to-be-processed incident and features of a plurality of historical incidents, wherein the plurality of similarity degrees represent respective similarity degrees between the to-be-processed incident and the plurality of historical incidents; and
   obtaining a similar incident from the plurality of historical incidents through filtering based on the plurality of similarity degrees, and recommending the similar incident.

10. The device according to claim 9, wherein after the obtaining the alarm information of the to-be-processed incident and before the obtaining the incident diagnosis information of the M dimensions based on the alarm information, the operations further include:

obtaining, based on the alarm information, a network type of a network in which the to-be-processed incident is located; and determining the M dimensions based on the network type.

11. The device according to claim 9, wherein the operation of performing the processing based on the incident diagnosis information of the M dimensions, to obtain the feature of the to-be-processed incident comprises:

performing feature extraction on each of the M dimensions based on the incident diagnosis information of the M dimensions, to obtain a feature value of each dimension; and combining the feature values of all the M dimensions, to obtain the feature of the to-be-processed incident, wherein the feature of the to-be-processed incident is a feature vector.

12. The device according to claim 9, wherein before the obtaining the incident diagnosis information of the M dimensions based on the alarm information, the operations further include: adjusting one or more dimensions in one or more preset dimensions, to obtain the M dimensions.

13. The device according to claim 9, wherein the operation of obtaining the similar incident from the plurality of historical incidents through filtering based on the plurality of similarity degrees, and recommending the similar incident comprises:

obtaining N historical incidents from the plurality of historical incidents through filtering based on the plurality of similarity degrees, and recommending the N historical incidents, wherein the N historical incidents are historical incidents associated with top N similarity degrees in the plurality of similarity degrees, the plurality of similarity degrees are sorted in a descending order, and N is a positive integer.

14. The device according to claim 13, wherein after the obtaining the similar incident from the plurality of historical incidents through filtering based on the plurality of similarity degrees, the operations further include:

recommending comparison information between the similar incident and the to-be-processed incident, wherein the comparison information comprises a condition of comparison between the similar incident and the to-be-processed incident in each of the M dimensions.

15. The device according to claim 9, wherein the plurality of historical incidents are incidents obtained from a database through filtering.

16. The device according to claim 9, wherein after the obtaining the similar incident from the plurality of historical incidents through filtering based on the plurality of similarity degrees, and recommending the similar incident, the operations further include:

receiving evaluation information for a recommended historical incident, wherein the evaluation information is used as reference information for subsequent historical-incident recommendation.

17. A non-transitory computer-readable storage medium storing a program, which is executed by one or more processors, and cause the one or more processors to perform operations comprising:

obtaining alarm information of a to-be-processed incident;

obtaining incident diagnosis information of M dimensions based on the alarm information, wherein the M dimensions comprise M different perspectives of incident diagnosis, and M is an integer greater than 1;

performing processing based on the incident diagnosis information of the M dimensions, to obtain a feature of the to-be-processed incident;

obtaining a plurality of similarity degrees based on the feature of the to-be-processed incident and features of a plurality of historical incidents, wherein the plurality of similarity degrees represent respective similarity degrees between the to-be-processed incident and the plurality of historical incidents; and obtaining a similar incident from the plurality of historical incidents through filtering based on the plurality of similarity degrees, and recommending the similar incident.

18. The non-transitory computer-readable storage medium according to claim 17, wherein after the obtaining the alarm information of the to-be-processed incident and before the obtaining the incident diagnosis information of the M dimensions based on the alarm information, the operations further comprise:

obtaining, based on the alarm information, a network type of a network in which the to-be-processed incident is located; and determining the M dimensions based on the network type.

19. The non-transitory computer-readable storage medium according to claim 17, wherein the operations further comprise:

performing feature extraction on each of the M dimensions based on the incident diagnosis information of the M dimensions, to obtain a feature value of each dimension; and combining the feature values of all the M dimensions, to obtain the feature of the to-be-processed incident, wherein the feature of the to-be-processed incident is a feature vector.

20. The non-transitory computer-readable storage medium according to claim 17, wherein the operations further comprise:

adjusting one or more dimensions in one or more preset dimensions, to obtain the M dimensions.

* * * * *